(12) United States Patent
Yoda

(10) Patent No.: US 11,790,670 B2
(45) Date of Patent: Oct. 17, 2023

(54) APPARATUS, METHOD, AND PROGRAM FOR DETERMINING ABNORMALITY IN INTERNAL DEVICES

(71) Applicant: HONDA MOTOR CO., LTD., Tokyo (JP)

(72) Inventor: Katsuo Yoda, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 264 days.

(21) Appl. No.: 17/201,595

(22) Filed: Mar. 15, 2021

(65) Prior Publication Data

US 2021/0295072 A1 Sep. 23, 2021

(30) Foreign Application Priority Data

Mar. 18, 2020 (JP) ................................ 2020-048397

(51) Int. Cl.
| | |
|---|---|
| *G06V 20/59* | (2022.01) |
| *G06V 10/141* | (2022.01) |
| *H04N 23/74* | (2023.01) |
| *G06V 10/98* | (2022.01) |

(52) U.S. Cl.
CPC .......... *G06V 20/597* (2022.01); *G06V 10/141* (2022.01); *G06V 10/993* (2022.01); *H04N 23/74* (2023.01)

(58) Field of Classification Search
CPC . B60R 11/04; B60R 21/01538; G06V 20/597; G06V 10/141; G06V 20/56; G06V 10/993; H04N 23/74
See application file for complete search history.

(56) References Cited

U.S. PATENT DOCUMENTS

| | | | |
|---|---|---|---|
| 2004/0036764 A1* | 2/2004 | Hirota | ................ G01C 21/3602 382/103 |
| 2006/0114318 A1 | 6/2006 | Saka et al. | |
| 2006/0115121 A1 | 6/2006 | Saka et al. | |

(Continued)

FOREIGN PATENT DOCUMENTS

| | | |
|---|---|---|
| CN | 110750482 A | 2/2020 |
| JP | 2009-159568 A | 7/2009 |

(Continued)

OTHER PUBLICATIONS

Office Action received in corresponding CN application No. 202110291662.9 dated Jul. 20, 2023.

*Primary Examiner* — Dung Hong
(74) *Attorney, Agent, or Firm* — Rankin, Hill & Clark LLP

(57) ABSTRACT

The present invention provides, for instance, an apparatus for determining an abnormality in internal devices, wherein processing of determining the presence or absence of an abnormality in the internal devices is simplified. This ECU is an abnormality determining apparatus for determining the presence or absence of an abnormality in internal devices including: an image acquiring unit configured to acquire an image inside a vehicle; a luminance acquiring unit configured to acquire luminance of the image; and an LED configured to illuminate an occupant of the vehicle. The ECU is provided with an abnormality determining unit configured to determine, based on the luminance of the image, the presence or absence of an abnormality in the image acquiring unit and/or the LED.

13 Claims, 8 Drawing Sheets

(56) References Cited

U.S. PATENT DOCUMENTS

| | | | | |
|---|---|---|---|---|
| 2013/0242073 A1* | 9/2013 | Watanabe | ............ | H04N 23/71 |
| | | | | 348/77 |
| 2014/0097957 A1* | 4/2014 | Breed | ............ | G08B 21/06 |
| | | | | 340/576 |
| 2020/0221057 A1 | 7/2020 | Shimoda et al. | | |
| 2020/0412944 A1* | 12/2020 | Okada | ............ | H04N 7/18 |
| 2021/0073522 A1* | 3/2021 | Sugawara | ............ | A61B 5/1128 |
| 2021/0221404 A1* | 7/2021 | Reiner | ............ | G06V 20/597 |
| 2021/0387640 A1* | 12/2021 | Tamori | ............ | A61B 5/7267 |
| 2022/0289250 A1* | 9/2022 | Oba | ............ | G08G 1/16 |

FOREIGN PATENT DOCUMENTS

| | | | | |
|---|---|---|---|---|
| JP | 2009159568 A | * | 7/2009 | |
| KR | 101538978 B1 | | 7/2015 | |
| WO | WO-2016191827 A1 | * | 12/2016 | ......... G06K 9/00832 |
| WO | WO-2019159683 A1 | * | 8/2019 | |
| WO | WO-2020016635 A1 | * | 1/2020 | |
| WO | WO-2019200434 A9 | * | 4/2020 | ......... G06K 9/00832 |

* cited by examiner

APPARATUS, METHOD, AND PROGRAM FOR DETERMINING ABNORMALITY IN INTERNAL DEVICES

TECHNICAL FIELD

The present invention relates to an apparatus for determining an abnormality in internal devices and others.

BACKGROUND ART

A technology has been proposed, including: capturing an image of a vehicle driver by camera; and, based on the captured image result, detecting drowsiness and/or inattention of the driver. Another technology has also been proposed, including detecting the presence or absence of an abnormality in an camera used to capture an image of a driver and/or an illuminating device for illuminating the driver when the image is captured. As such a technology, Japanese Patent Application Publication No. 2009-159568, for instance, describes an abnormality detecting device for detecting an abnormality in an illuminating device for illuminating a driver who drives a vehicle and an imaging device for photographing the driver illuminated by this illuminating device.

SUMMARY OF INVENTION

Technical Problem

Unfortunately, in the technology described in JP2009-159568A, the detection of an abnormality in the illuminating device and the detection of an abnormality in the imaging device are processed by different methods. This results in complicated processing in the abnormality detecting device, and the time until the abnormality is detected is prolonged. Thus, there is room for further simplifying the detection of an abnormality in internal devices including the illuminating device and the imaging device. However, JP2009-159568A is silent on such a technology.

Here, the present invention addresses the problem of providing, for instance, an apparatus for determining an abnormality in internal devices, wherein processing of determining the presence or absence of an abnormality in the internal devices is simplified.

Solution to Problem

An aspect of the present invention provides an apparatus for determining an abnormality in internal devices, comprising:
an image acquiring unit configured to acquire an image inside a moving body;
a luminance acquiring unit configured to acquire luminance of the image;
a lighting unit configured to illuminate an occupant of the moving body; and
an abnormality determining unit configured to determine, based on the luminance of the image, whether an abnormality is present or absent in the image acquiring unit and the lighting unit.

Advantageous Effects of Invention

The present invention makes it possible to provide, for instance, an apparatus for determining an abnormality in internal devices, wherein processing of determining the presence or absence of an abnormality in the internal devices is simplified.

DESCRIPTION OF EMBODIMENTS

First Embodiment

Figure 1:
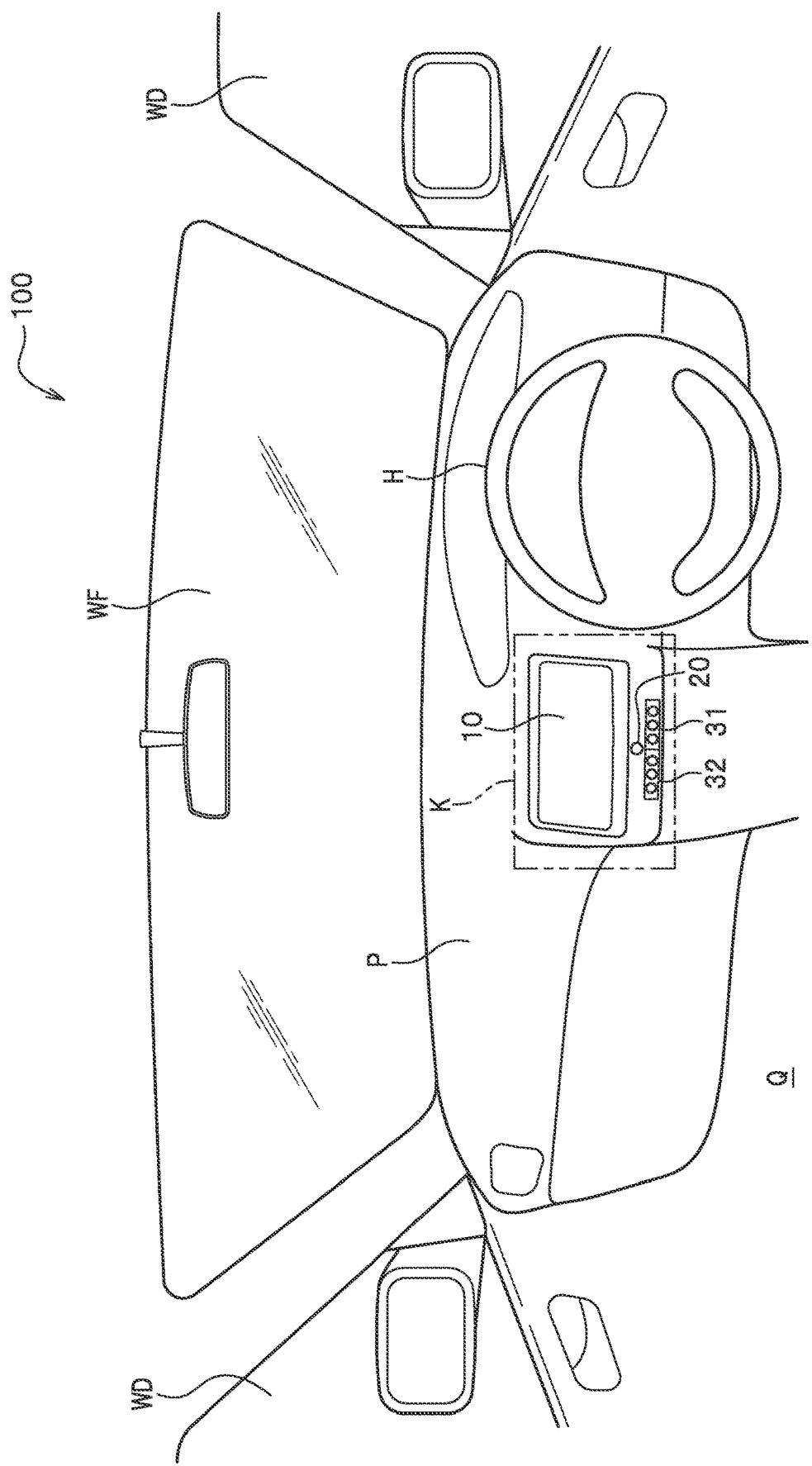
FIG. 1 is a diagram illustrating a cabin of a vehicle equipped with an abnormality determining apparatus according to a first embodiment, in which the presence or absence of an abnormality in a cabin camera, a driver seat-side LED, and an passenger seat-side LED is to be determined.

FIG. 1 is a diagram illustrating a cabin Q of a vehicle 100 equipped with an abnormality determining apparatus according to a first embodiment, in which the presence or absence (presence/absence) of an abnormality in a cabin camera 20, a driver seat-side LED 31, and an passenger seat-side LED 32 is to be determined.

Before the description of an Electronic Control Unit (ECU) (an abnormality determining apparatus; see FIG. 3) 50, the following briefly reviews a cabin camera 20, a driver seat-side LED 31 (lighting unit; first lighting unit), a passenger seat-side LED 32 (lighting unit; second lighting unit), and others, which are subject to determination of the presence or absence of an abnormality.

As illustrated in FIG. 1, an instrument panel P has a display 10 (display unit) at or near the middle in the vehicle width direction. The display 10 is configured to display given matters about the vehicle 100. For instance, the display 10 displays a prescribed navigation screen indicating how the state of the vehicle 100 and the surrounding of the vehicle 100 look like as well as a route from the current position to a destination. The cabin camera 20 as well as the driver seat-side LED 31 and the passenger seat-side LED 32, as described below, are provided at or near the display 10.

Figure 2:
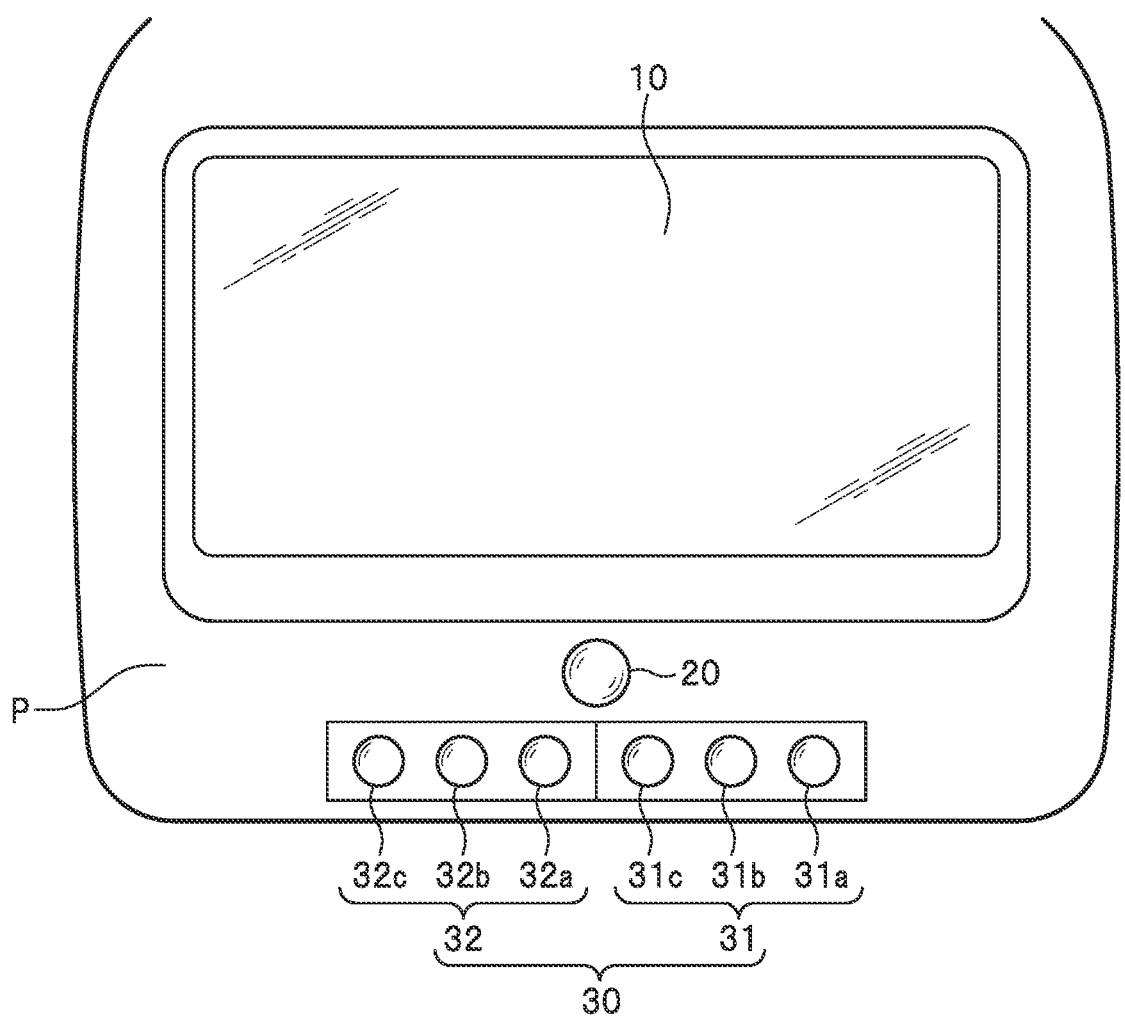
FIG. 2 is a partially enlarged view of area K in the abnormality determining apparatus according to the first embodiment as shown in FIG. 1.

FIG. 2 is a partially enlarged view of area K shown in FIG. 1.

The cabin camera 20 shown in FIG. 2 is a camera for imaging an occupant on a driver seat provided with a steering wheel H (see FIG. 1) and an occupant(s) on a passenger seat and/or a rear seat(s). As illustrated in FIG. 2, the instrument panel P has the cabin camera 20 at or near the display 10. More specifically, the cabin camera 20 is installed below the display 10 and at or near the meddle in the vehicle width direction.

The driver seat-side LED 31 and the passenger seat-side LED 32 can illuminate an occupant(s) of the vehicle 100 (see FIG. 1) and are installed at given positions of the instrument panel P. The driver seat-side LED 31 (first lighting unit) can function to illuminate the inside of the vehicle 100, namely, one side of the vehicle 100 in the vehicle width direction (the right side of the paper sheet in FIG. 2). This driver seat-side LED 31 includes three LEDs 31a, 31b, and 31c aligned with a predetermined space in the vehicle width direction. For instance, infrared light emitting diodes (infrared LEDs) are used for such LEDs 31a, 31b, and 31c.

The passenger seat-side LED 32 (second lighting unit) can function to illuminate the inside of the vehicle 100, namely, the other side of the vehicle 100 in the vehicle width direction (the left side of the paper sheet in FIG. 2). This passenger seat-side LED 32 includes three LEDs 32a, 32b, and 32c aligned with a predetermined space in the vehicle width direction. For instance, infrared LEDs are used for such LEDs 32a, 32b, and 32c.

In the example of FIG. 2, the LEDs 31a, 31b, 31c, 32a, 32b, and 32c are arranged below the cabin camera 20 and linearly aligned in this order with a predetermined space in the vehicle width direction. In addition, while the driver seat side (the right side of the paper sheet in FIG. 2) has the LEDs 31a, 31b, and 31c aligned in the vehicle width direction, the passenger seat side (the left side of the paper sheet in FIG. 2) has the LEDs 32a, 32b, and 32c.

Note that the "internal devices" of the vehicle 100 include the cabin camera 20, the driver seat-side LED 31, and the passenger seat-side LED 32. In addition, the driver seat-side LED 31 and the passenger seat-side LED 32 are generally referred to as an LED 30.

The LED 30 is turned on when the cabin camera 20 is used to image an occupant(s) who sits on a driver seat and/or a passenger seat. This enables the cabin camera 20 to image the occupant(s) during nighttime when almost no light comes through a windshield WF (see FIG. 1) or a door window(s) WD (see FIG. 1).

Figure 3:
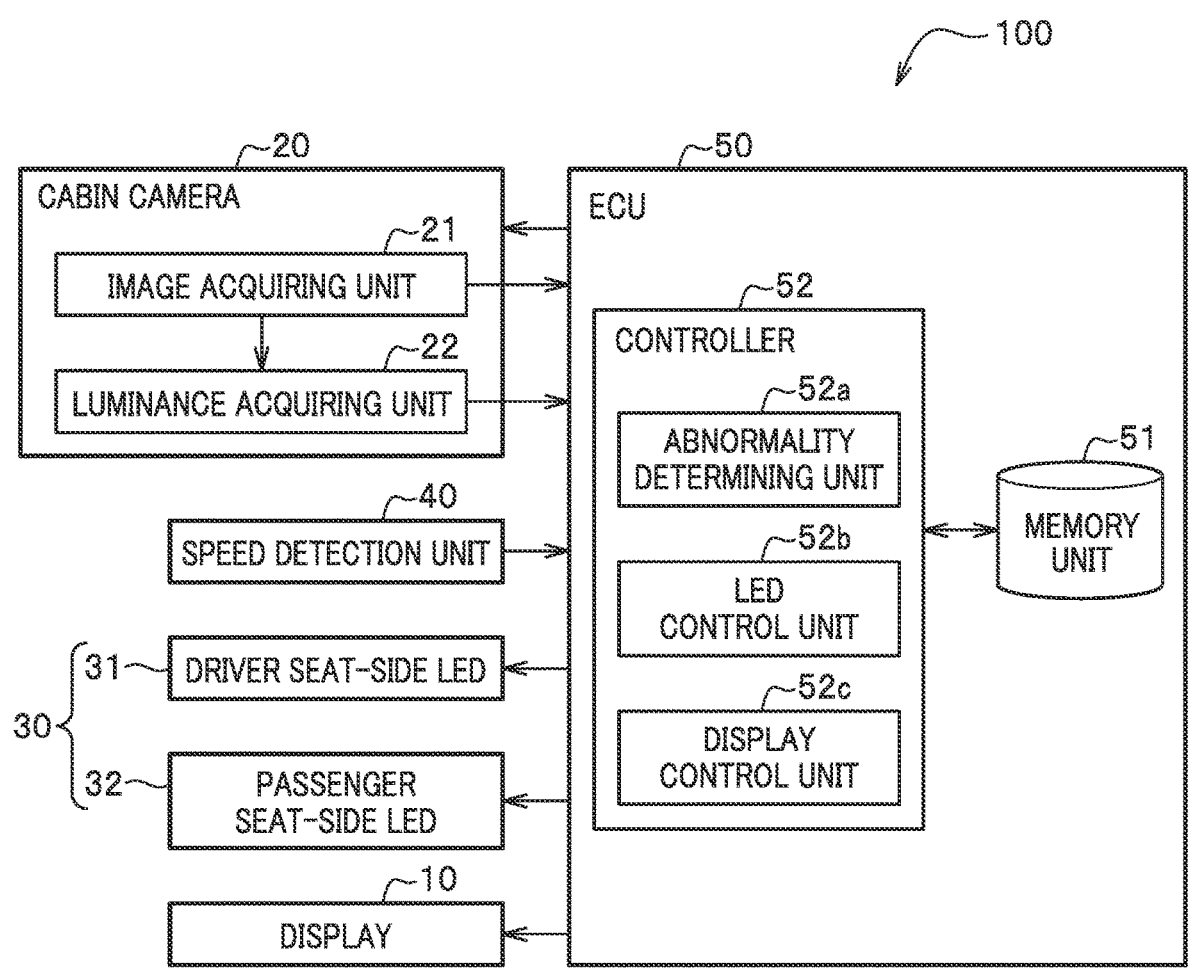
FIG. 3 is a functional block diagram including an ECU, which is the abnormality determining apparatus according to the first embodiment.

FIG. 3 is a functional block diagram including the ECU 50, which is an abnormality determining apparatus.

As shown in FIG. 3, the cabin camera 20 includes an image acquiring unit 21 and a luminance acquiring unit 22.

The image acquiring unit 21 can function to acquire an image inside the vehicle 100. Such an image acquiring unit 21 may be provided with an optical lens, an image-capturing element, and an A/D convertor (not shown). Examples of the image-capturing element used include a charge coupled device (CCD) sensor or a complementary metal oxide semiconductor (CMOS) sensor. Data about the image acquired by the image acquiring unit 21 is output to the luminance acquiring unit 22 and is output to the ECU 50.

The luminance acquiring unit 22 can acquire the luminance of an image from the image acquiring unit 21. Specifically, the luminance acquiring unit 22 is configured to acquire the luminance of each pixel included in this image on the basis of data about the image input from the image acquiring unit 21. Note that regarding the image input from the image acquiring unit 21, an area illuminated by the driver seat-side LED 31 and/or the passenger seat-side LED 32 may be preset. Then, the luminance acquiring unit 22 may acquire the averaged luminance of the area as the "luminance of an image" input from the image acquiring unit 21. Data about the luminance acquired by the luminance acquiring unit 22 is output to the ECU 50.

A speed detection unit 40 shown in FIG. 3 is configured to detect the traveling speed of the vehicle 100. For instance, the speed detection unit 40 is configured to detect the speed of the vehicle 100 on the basis of the vehicle wheel rotation number per unit time for the vehicle 100. Data about the speed as so detected by the speed detection unit 40 is output to the ECU 50.

The ECU 50 (abnormality determining apparatus) can function to control each device of the vehicle 100. The ECU 50 includes an electric circuit having a CPU (Central Processing Unit), a ROM (Read Only Memory), a RAM (Random Access Memory), various interfaces, and so on. The CPU reads a program stored in the ROM and deploys the program on the RAM, thereby executing various tasks.

As shown in FIG. 3, the ECU 50 includes a memory unit 51 and a controller 52. The memory unit 51 is configured to store a given program as well as given data input from the image acquiring unit 21, the luminance acquiring unit 22, the speed detection unit 40, and others.

The controller 52 can control, based on the data stored in the memory unit 51, respective devices including the cabin camera 20, the LED 30, and the display 10. As shown in FIG. 3, the controller 52 includes an abnormality determining unit 52a, an LED control unit 52b, and a display control unit 52c.

The abnormality determining unit 52a can function to determine the presence or absence of an abnormality in "internal devices" including the LED 30 and the image acquiring unit 21. The LED control unit 52b can function to control the LED 30 in a given manner. The display control unit 52c can function to control the display 10 in a given manner. Note that the details of the abnormality determining unit 52a, the LED control unit 52b, and the display control unit 52c are described later.

In addition, based on the results of imaging by the cabin camera 20, the ECU 50 may be configured to detect the line of sight of a driver. For instance, a prescribed reference point (almost static point) is set to a position where the light of LED 30 is shed in an eyeball of a driver. Based on the positional relationship with this reference point, the ECU 50 can identify the position of the pupil in the eyeball of the driver. In this way, the ECU 50 can detect the line of sight of the driver. Based on the detection results, it is possible to detect drowsiness and/or inattention of the driver. Note that the above way to detect the line of sight is just an example, and the invention is not limited to this example.

Figure 4:
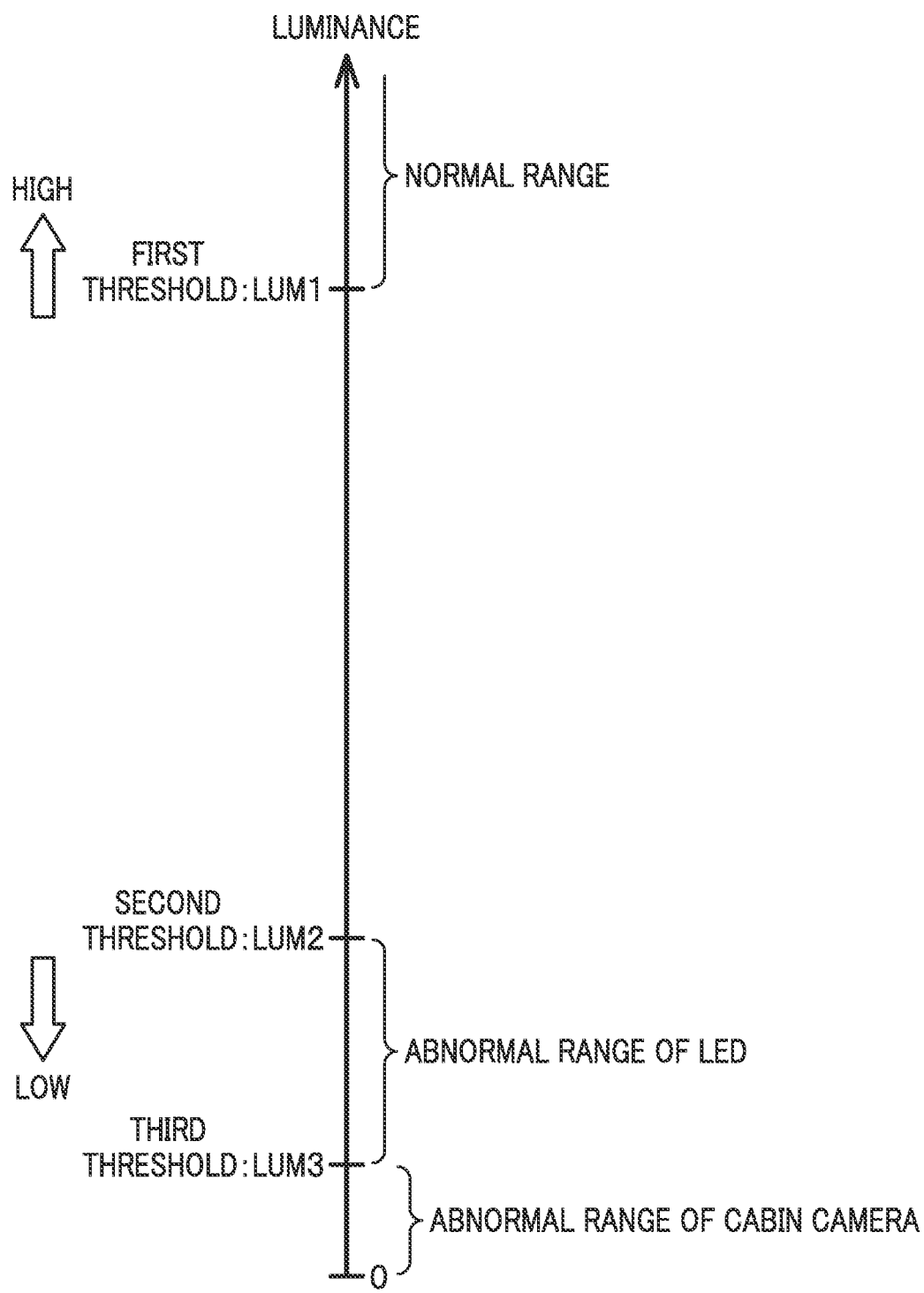
FIG. 4 is a diagram illustrating how to determine the presence or absence of an abnormality in a cabin camera and/or an LED by using the abnormality determining apparatus according to the first embodiment.

FIG. 4 is a diagram illustrating how to determine the presence or absence of an abnormality in the cabin camera and/or the LED (see, if appropriate, FIGS. 2 and 3).

Note that the vertical line shown in FIG. 4 represents the luminance of an image acquired by the luminance acquiring unit 22 while the ECU 50 outputs, to the LED 30, an instruction to turn light on. It is possible to use, as such a luminance, the averaged luminance of a predetermined area that is among respective pixels of an image as the result of imaging by the cabin camera 20 and is illuminated by the LED 30.

Hereinbelow, the luminance of an image as the result of imaging by the cabin camera 20 is simply referred to as the "luminance of an image". In addition, how large/small a first threshold LUM1, a second threshold LUM2, and a third threshold LUM3, which are luminance thresholds shown in FIG. 4, are is set to LUM1>LUM2>LUM3. That is, the second threshold LUM2 is a luminance threshold smaller than the first threshold LUM1 and larger than the third threshold LUM3.

The "normal range", where the luminance of an image is the first threshold LUM1 or greater, is a luminance range used as a reference when the ECU 50 determines that both the image acquiring unit 21 of the cabin camera 20 and the LED 30 are normal. If the cabin camera 20 operates normally and the LED 30 is lit up normally, the resulting image is relatively bright and the luminance of the image is the first threshold LUM1 or greater.

The "abnormal range of the cabin camera", where the luminance of an image is less than the third threshold LUM3, is a luminance range used as a reference when the ECU 50 determines that that at least the image acquiring unit 21 of the cabin camera 20 is abnormal. If the image acquiring unit 21 of the cabin camera 20 is abnormal, the luminance of an image is frequently very low.

The "abnormal range of the LED", where the luminance of an image is less than the second threshold LUM2 and equal to or greater than the third threshold LUM3, is a luminance range used as a reference when the ECU 50 determines that that the LED 30 is abnormal. If the LED 30 is abnormal, the luminance of an image is lower than during normal operation.

In this regard, the "internal devices" may be normal or the "internal devices" may somehow malfunction. Even in these cases, the luminance of an image is rarely within a range that is less than the first threshold LUM1 and equal to or greater than the second threshold LUM2.

In addition, the first embodiment describes an example where the first threshold LUM1, the second threshold LUM2, and the third threshold LUM3 are preset. Note that the second embodiment illustrates a case where the first threshold LUM1 and/or the second threshold LUM2 are variable.

Figure 5:
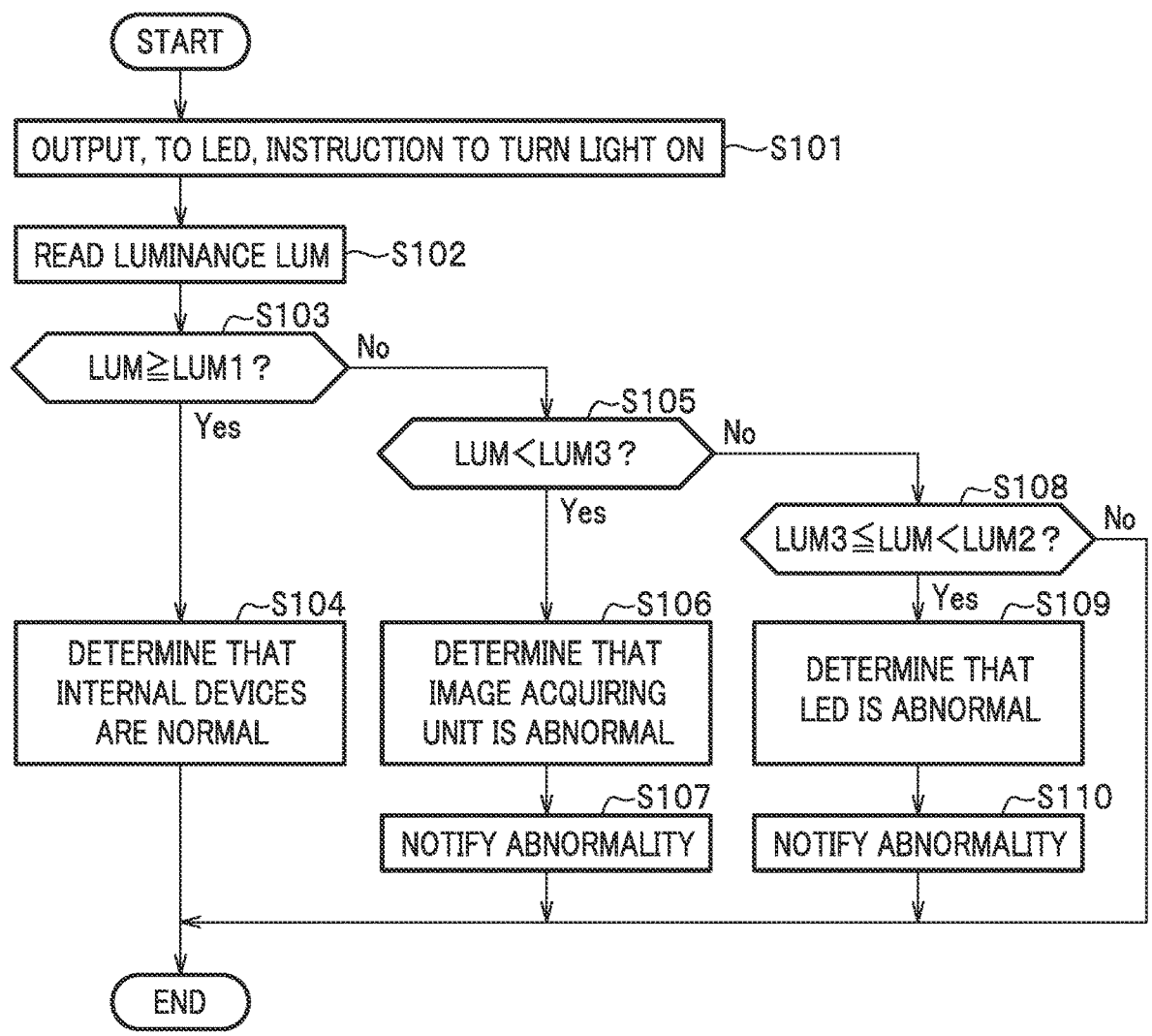
FIG. 5 is a flow chart of how the ECU executes processing about the presence or absence of an abnormality in a cabin camera and/or an LED by using the abnormality determining apparatus according to the first embodiment.

FIG. 5 is a flow chart of how the ECU executes processing about the presence or absence of an abnormality in the cabin camera and/or the LED (see, if appropriate, FIGS. 3 and 4).

Note that at the time of "START" in FIG. 5, the vehicle 100, for instance, may be prior to delivery or in a stop state (in a powered-on but not running state) in an inspection dark room (not shown) during maintenance.

At step S101, the ECU 50 uses the LED control unit 52b to output, to the LED 30, an instruction to turn light on. Specifically, the ECU 50 outputs, to the driver seat-side LED 31 and the passenger seat-side LED 32, an instruction to turn light on.

At step S102, the ECU 50 reads the luminance LUM of an image. Specifically, the ECU 50 reads the luminance LUM of an image as the result of imaging by the cabin camera 20.

At step S103, the ECU 50 determines whether or not the luminance LUM of the image is equal to or greater than the first threshold LUM1 (see FIG. 4). If the luminance LUM of the image is equal to or greater than the first threshold LUM1 (S103: Yes), the processing of the ECU 50 goes to step S104.

At step S104, the ECU 50 uses the abnormality determining unit 52a to determine that the internal devices are normal. Specifically, the ECU 50 determines that both the image acquiring unit 21 and the LED 30 are normal. This is because the cabin Q (see FIG. 1) is suitably illuminated with infrared light from the LED 30, this infrared light is appropriately converted, by the image acquiring unit 21, to a predetermined electric signal (electric signal indicating the luminance of each pixel), and, as a result, the luminance of the resulting image is equal to or greater than the first threshold LUM1.

Meanwhile, when the luminance LUM of the image is less than the first threshold LUM1 at step S103 (S103: No), the processing of the ECU 50 goes to step S105. At step S105, the ECU 50 determines whether or not the luminance LUM of the image is less than the third threshold LUM3. When the luminance of the image is less than the third threshold LUM3 (S105: Yes), the processing of the ECU 50 goes to step S106.

At step S106, the ECU 50 uses the abnormality determining unit 52a to determine that the image acquiring unit 21 of the cabin camera 20 is abnormal (abnormality determining step). This is because the luminance LUM of the image is very low, which is improbable during normal operation. At step S107, the ECU 50 notifies the abnormality. For instance, the ECU 50 lets the display 10 display that the vehicle 100 should be under maintenance.

On the other hand, if the luminance LUM of the image is equal to or greater than the third threshold LUM3 at step S105 (S105: No), the processing of the ECU 50 goes to step S108.

At step S108, the ECU 50 determines whether the luminance LUM of the image is equal to greater than the third threshold LUM3 and less than the second threshold LUM2. When the luminance LUM of the image is equal to greater than the third threshold LUM3 and less than the second threshold LUM2 (S108: Yes), the processing of the ECU 50 goes to step S109.

At step S109, the ECU 50 uses the abnormality determining unit 52a to determine that the LED 30 is abnormal (abnormality determining step). This is because when the LED 30 is abnormal, an image as the result of imaging by the cabin camera 20 is dark and, as a result, the luminance of the image is low. As such, in the example of the first embodiment, the abnormality determining unit 52a determines, based on only the luminance of the image, the presence or absence of an abnormality in the image acquiring unit 21 and/or the LED 30.

At step S110, the ECU 50 notifies the abnormality. For instance, the ECU 50 uses the display control unit 52c to display, on the display 10, that the vehicle 100 should be under maintenance.

After the processing at step S104, S107, or S110, the ECU 50 ends the series of processing (END).

<Operation and Effects>

The ECU 50 in the first embodiment essentially has the above configuration. The following describes the operations and effects exerted by the processing of the ECU 50.

As illustrated in FIGS. 1 to 5, the ECU 50 (apparatus for determining an abnormality in internal devices) is an abnormality determining apparatus for determining the presence or absence of an abnormality in internal devices, the apparatus including: the image acquiring unit 21 configured to acquire an image inside the vehicle 100 (moving body); the luminance acquiring unit 22 configured to acquire the luminance of this image; and the LED 30 (lighting unit) configured to illuminate an occupant(s) of the vehicle 100, the apparatus further including the abnormality determining unit 52a configured to determine, based on the luminance of the image, the presence or absence of an abnormality in the LED 30 and/or the image acquiring unit 21.

Such a configuration makes it possible to simplify the processing of the abnormality determining unit 52a when compared to the case of individually determining an abnormality in the LED 30 and an abnormality in the image acquiring unit 21 by using different methods. In addition, it is possible to markedly shorten the time until the results determined by the abnormality determining unit 52a are obtained.

Further, as illustrated in FIGS. 1 to 5, when the luminance of an image is equal to or greater than the first threshold LUM1 while the LED 30 receives an instruction to turn light on (S103 in FIG. 5: Yes), the abnormality determining unit 52a determines that the above internal devices are normal (S104). Furthermore, if the luminance of the image is equal to greater than the third threshold LUM3 and less than the second threshold LUM2 while the LED 30 receives an instruction to turn light on (S108: Yes), the abnormality determining unit 52a determines that the LED 30 is abnormal (S109). Moreover, when the luminance of the image is less than the third threshold LUM3 while the LED 30 receives an instruction to turn light on (S105: Yes), the abnormality determining unit 52a determines that at least the image acquiring unit 21 is abnormal. Note that the second threshold LUM2 is smaller than the first threshold LUM1 and greater than the third threshold LUM3.

Such a configuration makes it possible to determine the presence or absence of an abnormality simply and quickly in the internal devices by using the ECU 50 to compare the magnitude between each threshold and the luminance of the image acquired by the image acquiring unit 21.

Second Embodiment

In the second embodiment, the luminance of an image is acquired while the ECU 50 outputs, to the LED 30, an instruction to turn light off. Based on this luminance, the first threshold LUM1 and the second threshold LUM2 are set. This point is a difference from the first embodiment. Note that the other points (e.g., the structure of the vehicle 100; see FIGS. 1 to 4) are like in the first embodiment. Thus, a portion distinct from the first embodiment will be described, and the description of the overlapping portion is omitted.

Figure 6:
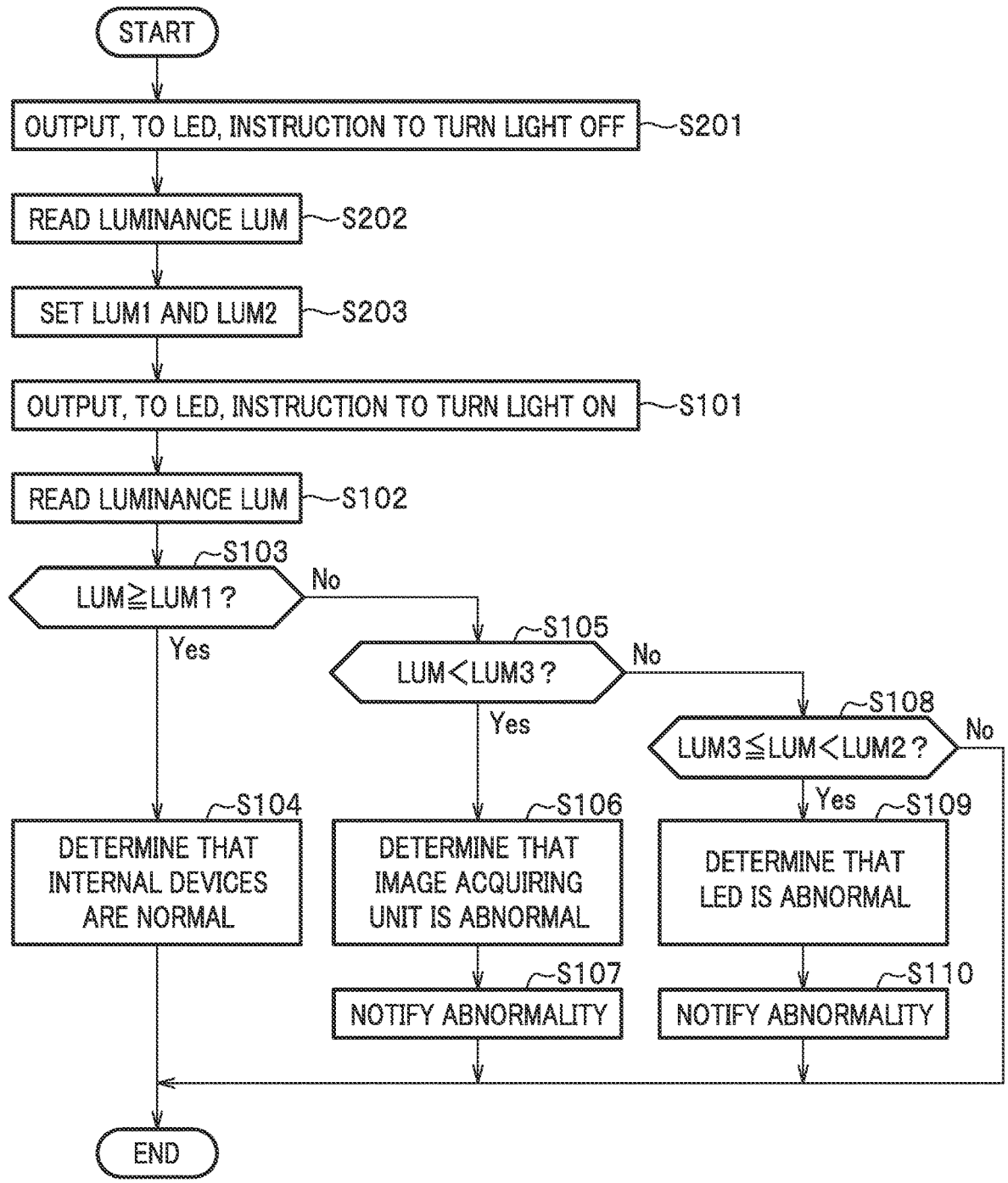
FIG. 6 is a flow chart of how the ECU executes processing about the presence or absence of an abnormality in a cabin camera and/or an LED by using an abnormality determining apparatus according to a second embodiment.

FIG. 6 is a flow chart of how the ECU executes processing about the presence or absence of an abnormality in the cabin camera and/or the LED (see, if appropriate, FIGS. 3 and 4).

Note that it is preferable that at the "START" in FIG. 6, the speed of the vehicle 100 is a predetermined value or less (including a state where the speed is zero). That is, it is preferable that the ECU 50 determines (i.e., executes a series of processing in FIG. 6) the presence or absence of an abnormality in the LED 30 and/or the image acquiring unit 21 of the cabin camera 20 while the speed of the vehicle 100 is a predetermined value or less. This can prevent an abnormality in the image acquiring unit 21 and/or an abnormality in the LED 30 from being determined under environments with different lighting conditions.

In this regard, the time required for the series of processing in FIG. 6 is, for instance, several msec. Accordingly, even if the above speed condition cannot be set, there is almost no trouble happening when an abnormality in the image acquiring unit 21 and/or the LED 30 is determined.

At step S201 in FIG. 6, the ECU 50 uses the LED control unit 52b to output, to the LED 30, an instruction to turn light off.

Next, at step S202, the ECU 50 reads the luminance LUM of an image. This allows the ECU 50 to acquire the luminance LUM of the image while the light of the LED 30 is turned off. This luminance LUM is affected by the brightness of outside light (natural light) coming through the windshield FW (see FIG. 1) and/or the door window(s) DW (see FIG. 1). Note that this mode in which the luminance of an image is acquired while the LED 30 receives an instruction to turn light off is called an "outside light detection mode".

Next, at step S203, the ECU 50 sets the first threshold LUM1 (see FIG. 4) and the second threshold LUM2 (see FIG. 4) with respect to the luminance of the image. For instance, the ECU 50 sets the first threshold LUM1 and the second threshold LUM2 to higher values as the luminance of the image acquired under the outside light detection mode increases. This enables the ECU 50 to determine, with high precision, the presence or absence of an abnormality in the image acquiring unit 21 and/or the LED 30 even under conditions in which outside light is coming into the cabin Q (see FIG. 1).

Note that the third threshold LUM3 (see FIG. 4) may be set to a fixed value while the first threshold LUM1 and the second threshold LUM2 are variable. This is because as described above, the third threshold LUM3 is used when the presence or absence of an abnormality in the image acquiring unit 21 is determined; and if the image acquiring unit 21 is abnormal, the luminance of the image read by the ECU 50 is very low regardless of brightness in the cabin Q.

After the processing at step S203, the ECU 50 appropriately executes the processing of steps S101 to S110 indicated in FIG. 6. Note that each process from step S101 to S110 is like in the first embodiment (see FIG. 5), and the description is thus omitted. Meanwhile, the mode in which the luminance of an image is acquired while the ECU 50 outputs, to the LED 30, an instruction to turn light off (S101 and S102) after the above-mentioned outside light detection mode (S201 and S202) is executed is called an "inside detection mode".

<Operations and Effects>

The ECU 50 in the second embodiment essentially has the above configuration. The following describes the operations and effects exerted by the processing of the ECU 50.

As illustrated in FIGS. 1 to 4 and 6, the abnormality determining unit 52a of the ECU 50 (apparatus for determining an abnormality in internal devices) executes the outside light detection mode in which the luminance acquiring unit 22 acquires the luminance of an image indicating the brightness of outside light while the LED 30 (lighting unit) receives an instruction to turn light off (S201 and S202 in FIG. 6); and the abnormality determining unit 52a executes the inside detection mode in which the luminance acquiring unit 22 acquires the luminance of an image while the LED 30 receives an instruction to turn light on (S101 and S102). Then, the abnormality determining unit 52a sets, based on the luminance of the image under the outside light detection mode, the second threshold LUM2 used in the inside detection mode (S203).

Such a configuration enables the ECU 50 to appropriately determine the presence or absence of an abnormality in the image acquiring unit 21 and/or the LED 30 even under conditions in which outside light is coming into the cabin Q.

In addition, as illustrated in FIGS. 1 to 4 and 6, the abnormality determining unit 52a of the ECU 50 (apparatus for determining an abnormality in internal devices) sets, based on the luminance of the image under the outside light detection mode, the first threshold LUM1 used in the inside detection mode (S203).

Such a configuration enables the ECU 50 to appropriately determine the presence or absence of an abnormality in the image acquiring unit 21 and/or the LED 30 even under conditions in which outside light is coming into the cabin Q.

Additionally, as shown in FIG. 3, the ECU 50 (apparatus for determining an abnormality in internal devices) further includes a speed detection unit 40 configured to detect the speed of the vehicle 100 (moving body). It is preferable that the abnormality determining unit 52a executes the outside light detection mode and the inside detection mode when the speed of the vehicle 100 is a predetermined value or less.

Such a configuration makes it possible to suitable determine an abnormality because an abnormality in the image acquiring unit 21 and/or the LED 30 is determined under an environment with substantially the same lighting condition.

Further, it is preferable that the abnormality determining unit 52a executes neither the outside light detection mode nor the inside detection mode when the speed of the vehicle 100 is more than the predetermined value.

Such a configuration is further unlikely to cause an error about the presence or absence of an abnormality in the image acquiring unit 21 and/or the LED 30.

Third Embodiment

The third embodiment pertains to the LED 30 (see FIGS. 2 and 3), and separately determines the presence or absence of an abnormality in the driver seat-side LED 31 and the presence or absence of an abnormality in the passenger seat-side LED 32. This point is a difference from the second embodiment. Note that the other points (e.g., the structure of the vehicle 100; see FIGS. 1 to 4) are like in the second embodiment. Thus, a portion distinct from the second embodiment will be described, and the description of the overlapping portion is omitted.

Figure 7A:
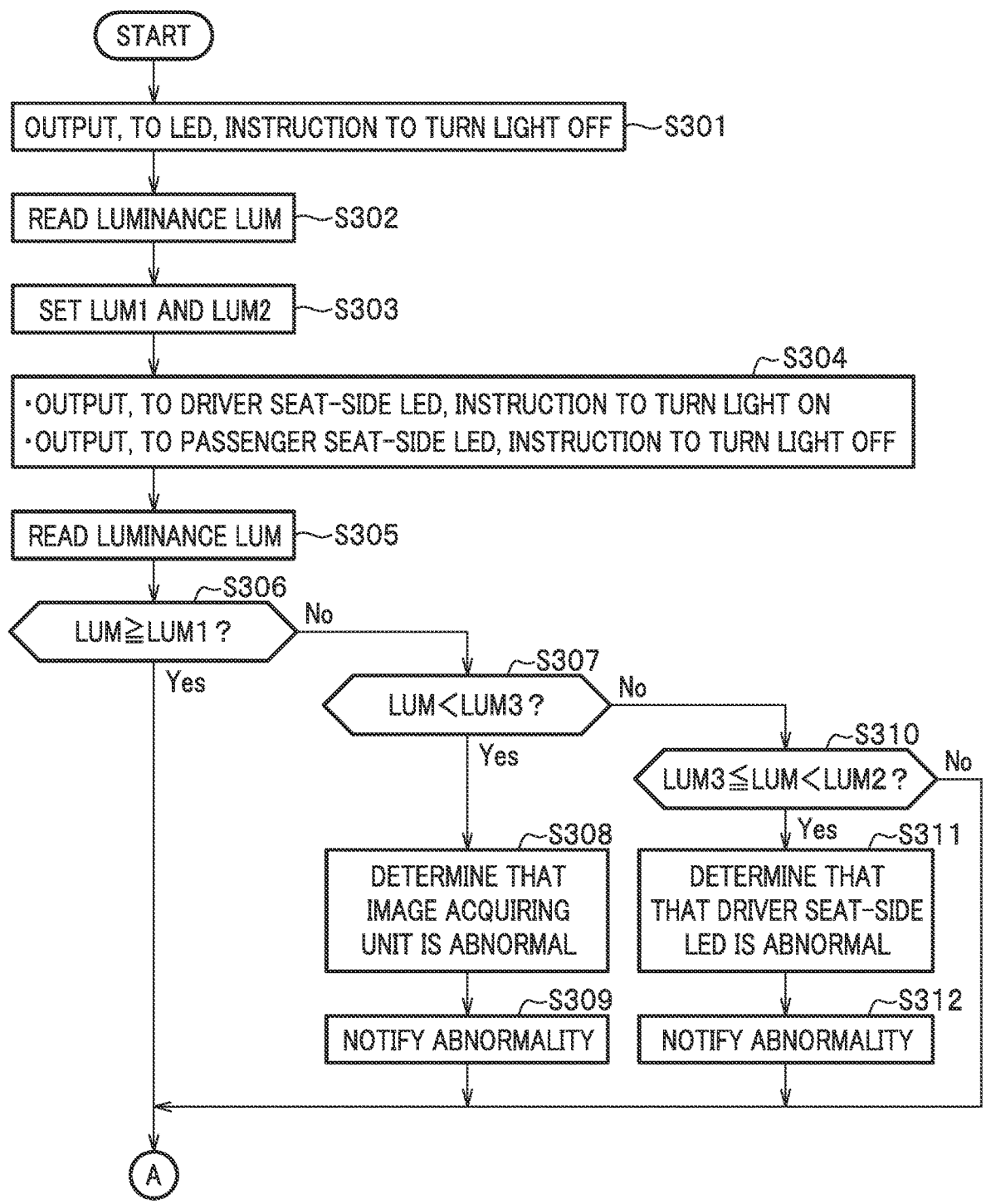
FIG. 7A is a flow chart of how the ECU executes processing about the presence or absence of an abnormality in a cabin camera and/or an LED by using an abnormality determining apparatus according to a third embodiment.
Figure 7B:
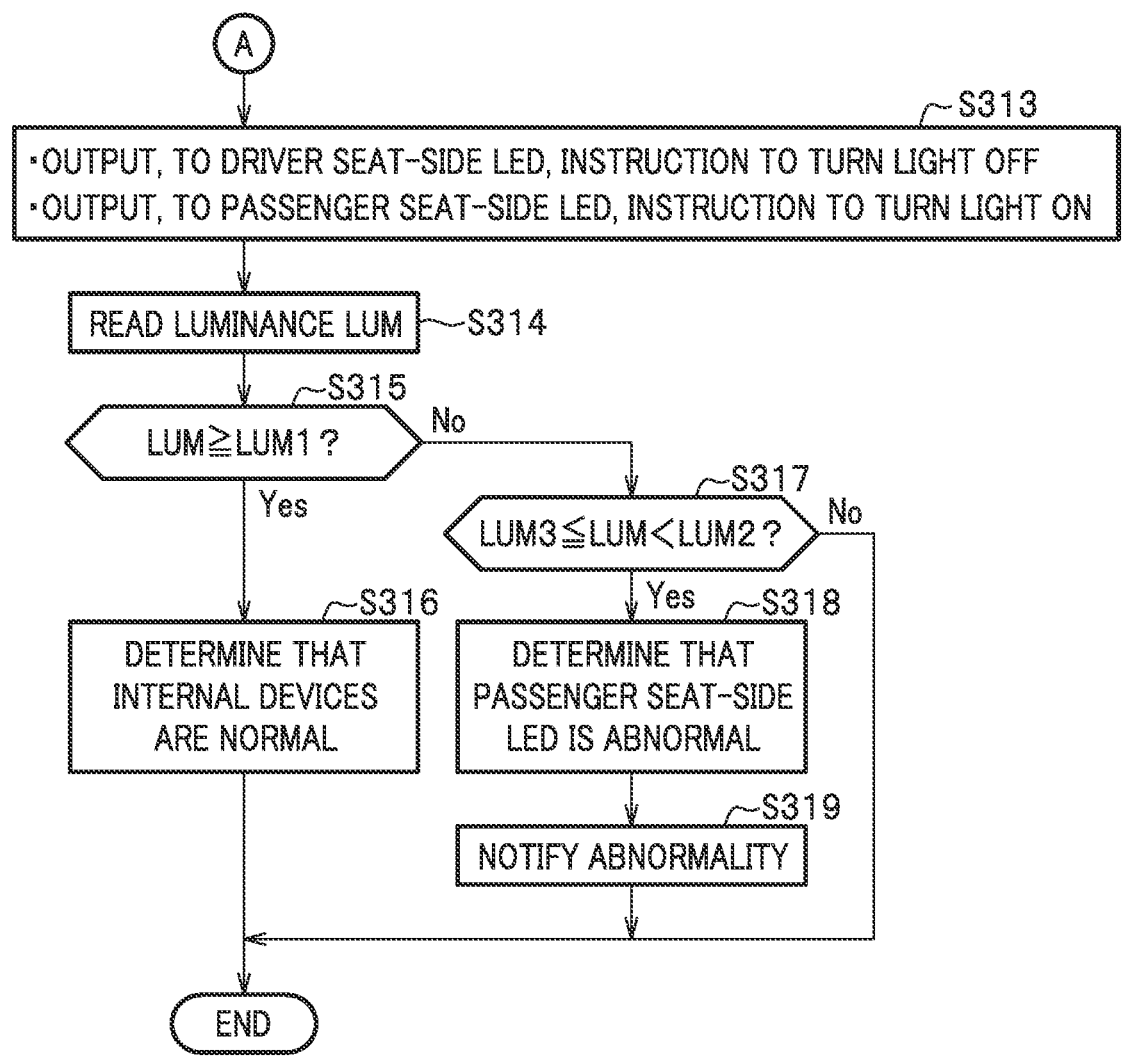
FIG. 7B is a flow chart of how the ECU executes processing about the presence or absence of an abnormality in the cabin camera and/or the LED by using the abnormality determining apparatus according to the third embodiment.

FIGS. 7A and 7B are each a flow chart of how the ECU executes processing about the presence or absence of an abnormality in the cabin camera and/or the LED (see, if appropriate, FIGS. 3 and 4).

Note that at the time of "START" in FIG. 7A, the vehicle 100, for instance, may be stopped or may travel at a speed of a predetermined value or less. Meanwhile, the processing from step S301 to S303 in FIG. 7A is like the processing from step S201 to S203 in the second embodiment (see FIG. 6), and the description is thus omitted.

At step S303 in FIG. 7A, the first threshold LUM1 and the second threshold LUM2 are set, and the processing of the ECU 50 then goes to step S304.

At step S304, the ECU 50 uses the LED control unit 52b to output, to the driver seat-side LED 31, an instruction to turn light on and, on the other hand, output, to the passenger seat-side LED 32, an instruction to turn light off.

Next, at step S305, the ECU 50 reads the luminance LUM of an image. Note that the "first inside detection mode" refers to a mode in which the luminance LUM of an image is acquired while the driver seat-side LED 31 receives an instruction to turn light on and the passenger seat-side LED 32 receives an instruction to turn light off.

At step S306, the ECU 50 determines whether or not the luminance LUM of the image is equal to or greater than the first threshold LUM1. If the luminance LUM of the image is equal to or greater than the first threshold LUM1 (S306: Yes), the processing of the ECU 50 goes to step S313 in FIG. 7B. By contrast, if the luminance LUM of the image is less than the first threshold LUM1 at step S306 (S306: No), the processing of the ECU 50 goes to step S307.

Next, if the luminance LUM of the image is less than the third threshold LUM3 at step S307 (S307: Yes), the abnormality determining unit 52a of the ECU 50 determines that the image acquiring unit 21 is abnormal (S308) and notifies this abnormality (S309). By contrast, if the luminance LUM of the image is equal to or greater than the third threshold LUM3 at step S307 (S307: No), the processing of the ECU 50 goes to step S310.

Then, if the luminance LUM of the image is equal to or greater than the third threshold LUM3 and less than the second threshold LUM2 at step S310 (S310: Yes), the ECU 50 determines that the driver seat-side LED 31 is abnormal (S311) and notifies this abnormality (S312). After the processing at step S309 or S312, the processing of the ECU 50 goes to step S313 in FIG. 7B.

At step S313 in FIG. 7B, the ECU 50 uses the LED control unit 52b to output, to the driver seat-side LED 31, an instruction to turn light off and, on the other hand, output, to the passenger seat-side LED 32, an instruction to turn light on.

Next, at step S314, the ECU 50 reads the luminance LUM of an image. Note that the "second inside detection mode" refers to a mode in which the luminance LUM of an image is acquired while the driver seat-side LED 31 receives an instruction to turn light off and the passenger seat-side LED 32 receives an instruction to turn light on.

At step S315, the ECU 50 again determines whether or not the luminance LUM of the image is equal to or greater than the first threshold LUM1. If the luminance LUM of the image is equal to or greater than the first threshold LUM1 (S315: Yes), the abnormality determining unit 52a of the ECU 50 determines that the internal devices are normal (S316).

By contrast, if the luminance LUM of the image is less than the first threshold LUM1 at step S315 (S315: No), the processing of the ECU 50 goes to step S317.

Then, if the luminance LUM of the image is equal to or greater than the third threshold LUM3 and less than the second threshold LUM2 at step S317 (S317: Yes), the abnormality determining unit 52a of the ECU 50 determines that the passenger seat-side LED 32 is abnormal (S318) and notifies this abnormality (S319). After the processing at step S316 or S319, the ECU 50 ends the series of processing (END).

The ECU 50 in the third embodiment essentially has the above configuration. The following describes the actions and effects exerted by the processing of the ECU 50.

As illustrated in FIGS. 1 to 4, 7A, and 7B, the LED 30 (lighting unit) includes, in the vehicle 100 (moving body), the driver seat-side LED 31 (first lighting unit), which illuminates one side of the vehicle 100 in the vehicle widthwise direction, and the passenger seat-side LED 32 (second lighting unit), which illuminates the other side of the vehicle 100 in the vehicle widthwise direction. Then, the abnormality determining unit 52a executes the first inside detection mode for acquiring the luminance of an image by using the luminance acquiring unit 22 while the driver seat-side LED 31 receives an instruction to turn light on and the passenger seat-side LED 32 receives an instruction to turn light off. Based on the results from this first inside detection mode, the presence or absence of an abnormality in the driver seat-side LED 31 is determined. Further, the abnormality determining unit 52a executes the second inside detection mode for acquiring the luminance of an image by using the luminance acquiring unit 22 while the driver seat-side LED 31 receives an instruction to turn light off and the passenger seat-side LED 32 receives an instruction to turn light on. Based on the results from this second inside detection mode, the presence or absence of an abnormality in the passenger seat-side LED 32 is determined.

Such a configuration enables the abnormality determining unit 52a to identify whether or not any of the driver seat-side LED 31 and/or the passenger seat-side LED 32 is abnormal when the LED 30 has an abnormality. Hence, this makes it easier for a worker to identify a site of abnormality in the LED 30 during maintenance of the vehicle 100.

<<Modification Embodiment>>

Hereinabove, the ECU 50, etc., (see FIG. 3) in the invention has been described with reference to each embodiment. The invention, however, is not limited to the disclosure, and various modifications are applicable. For instance, the following processing may be carried out when the abnormality determining unit 52a determines the presence or absence of an abnormality in the internal devices. Specifically, the image acquiring unit 21 of the cabin camera 20 may be installed at or near the display 10 (display unit) (see FIG. 2); the abnormality determining unit 52a executes both the outside light detection mode and the inside detection mode either while the display 10 is operated; or while the display 10 is not operated.

Such a configuration can mitigate how much the state of the display 10 affects determination of the presence or absence of an abnormality in the internal devices.

In addition, in each embodiment, the ECU 50 compares the magnitude between the luminance LUM of an image and the first threshold LUM1 (S103 in FIG. 5), and then compares the magnitude between the luminance LUM and the other respective thresholds. This processing has been described. However, the invention is not limited to this processing. For instance, the abnormality determining unit 52a may determine, immediately after the outside light detection mode, whether or not the luminance LUM of an image is less than the third threshold LUM3; if the luminance LUM of the image is less than the third threshold LUM3, it is determined that the image acquiring unit 21 is abnormal; and the inside detection mode may be avoided.

In such a configuration, if the image acquiring unit 21 is determined to be abnormal, the abnormality determining unit 52a does not proceed to the inside detection mode. Thus, the results of determining the presence or absence of an abnormality in the internal devices can be more quickly obtained than in each embodiment.

Also, in the third embodiment, the ECU 50 under the inside detection mode instructs one of the driver seat-side LED 31 or the passenger seat-side LED 32 to turn light on and instructs the other to turn light off so as to determine the presence or absence of an abnormality in each LED. This processing has been described. The invention, however, is not limited to this processing. For instance, the abnormality determining unit 52a executes the inside detection mode for acquiring the luminance of an image by using the luminance acquiring unit 22 while the driver seat-side LED 31 (first lighting unit) and the passenger seat-side LED 32 (second lighting unit) each receive an instruction to turn light on. Then, the presence or absence of an abnormality in the driver seat-side LED 31 may be determined on the basis of the luminance in an area that is within the image obtained under the inside detection mode and is illuminated by the driver seat-side LED 31. Further, the abnormality determining unit 52a may determine the presence or absence of an abnormality in the passenger seat-side LED 32 (second lighting unit) on the basis of the luminance in an area that is within the image obtained under the inside detection mode and is illuminated by the passenger seat-side LED 32.

Such a configuration enables the abnormality determining unit 52a to identify which of the driver seat-side LED 31 and/or the passenger seat-side LED 32 is abnormal. Hence, this makes it easier for a worker to identify a site of abnormality in the LED 30 during maintenance of the vehicle 100.

In addition, each embodiment describes a case where the cabin camera 20 (see FIG. 3) has both the image acquiring unit 21 and the luminance acquiring unit 22. The invention, however, is not limited to this case. For instance, while the cabin camera 20 has the image acquiring unit 21, the ECU 50 and/or an external server (not shown) may serve as the luminance acquiring unit 22.

Further, each embodiment describes a case where the ECU 50 (see FIG. 3) has the abnormality determining unit 52a. The invention, however, is not limited to this case. For instance. an external server (not shown) may serve as the abnormality determining unit 52a.

The number and alignment (see FIG. 2) of LEDs with respect to the driver seat-side LED 31 and/or the passenger seat-side LED 32 shown in FIG. 2 are just an example, and may thus be modified, if appropriate.

Furthermore, a given device(s) other than the cabin camera 20 and the LED 30 may be included in the "internal devices". The presence or absence of an abnormality in this device may be together determined by using the abnormality determining unit 52a and a prescribed procedure.

Meanwhile, the second and third embodiments describe a case where the ECU 50 sets, based on the luminance of an image acquired under the outside light detection mode, both the first threshold LUM1 and the second threshold LUM2 (i.e., each threshold is variable). The invention, however, is not limited to this case. For instance, one of the first threshold LUM1 or the second threshold LUM2 may be variable, and the other may be a fixed value.

In addition, the second and third embodiments describe processing where the ECU 50 executes the outside light detection mode and then executes the inside detection mode. The invention, however, is not limited to this processing. For instance, the ECU 50 may execute the inside detection mode, and then execute the outside light detection mode; the first threshold LUM1 and the second threshold LUM2 may be set on the basis of the luminance of an image obtained under this outside light detection mode; and given abnormality determination may be further carried out on the basis of the luminance of the image obtained under the inside detection mode.

In addition, the type of the "lighting unit" for illuminating an occupant(s) of the vehicle 100 is not limited to LED. Other types of optical device may be used.

Further, the second embodiment describes a case where the first threshold LUM1 and the second threshold LUM2 are set based on the luminance of an image while the light of the LED 30 is turned off. The invention, however, is not limited to this case. For instance, the first threshold LUM1 and the second threshold LUM2 may each be a fixed value; and the luminance of an image obtained while the light of the LED 30 is turned off may then be subtracted from the luminance of an image obtained while the light of the LED 30 is turned on. Note that the same applies to the third embodiment.

In addition, each embodiment is applicable to various moving bodies such as four-wheel vehicles, two-wheel or three-wheel vehicles, and ships or airplanes. Further, a storage medium such as a memory, a hard disk, or an IC (Integrated Circuit) card may store a program, etc., for executing, in a computer, the method described in each embodiment (method for determining an abnormality in internal devices).

REFERENCE SIGNS LIST

- 10 Display (Display unit)
- 20 Cabin camera (Internal device)
- 21 Image acquiring unit (Internal device)
- 22 Luminance acquiring unit
- 30 LED (Internal device, lighting unit)
- 31, 31a, 31b, 31c Driver seat-side LED (Internal device, lighting unit, first lighting unit)
- 32, 32a, 32b, 32c Passenger seat-side LED (Internal device, lighting unit, second lighting unit)
- 40 Speed detection unit
- 50 ECU (Apparatus for determining an abnormality in internal devices)
- 51 Memory unit
- 52 Controller
- 52a Abnormality determining unit
- 52b LED control unit
- 52c Display control unit
- 100 Vehicle (Moving body)
- Q Cabin (Inside of a moving body)

The invention claimed is:

1. An apparatus for determining an abnormality in internal devices, comprising:
   an image acquiring unit configured to acquire an image inside a moving body;
   a luminance acquiring unit configured to acquire luminance of the image;
   a lighting unit configured to illuminate an occupant of the moving body; and
   an abnormality determining unit configured to determine, based on the luminance of the image, whether an abnormality is present or absent in the image acquiring unit and the lighting unit,
   wherein
   the abnormality determining unit determines that the internal devices are normal when the luminance of the image is equal to or greater than a first threshold while the lighting unit receives an instruction to turn light on;
   the abnormality determining unit determines that the lighting unit is abnormal when the luminance of the image is equal to or greater than a third threshold and less than a second threshold while the lighting unit receives an instruction to turn light on;
   the abnormality determining unit determines that at least the image acquiring unit is abnormal when the luminance of the image is less than the third threshold while the lighting unit receives an instruction to turn light on; and
   the second threshold is less than the first threshold and greater than the third threshold.

2. The apparatus of claim 1, wherein the abnormality determining unit executes an outside light detection mode in which the luminance acquiring unit acquires the luminance of the image, indicating brightness of outside light, while the lighting unit receives an instruction to turn light off and executes an inside detection mode in which the luminance acquiring unit acquires the luminance of the image while the lighting unit receives an instruction to turn light on; and
   the abnormality determining unit sets, based on the luminance of the image under the outside light detection mode, the second threshold used in the inside detection mode.

3. The apparatus of claim 2, wherein the abnormality determining unit sets, based on the luminance of the image under the outside light detection mode, the first threshold used in the inside detection mode.

4. The apparatus of claim 3, further comprising a speed detection unit configured to detect a speed of the moving body,
   wherein the abnormality determining unit executes the outside light detection mode and the inside detection mode when the speed is a predetermined value or less.

5. The apparatus of claim 3, further comprising a display unit configured to display a given matter about the moving body,
   wherein the image acquiring unit is installed at or near the display unit, and
   the abnormality determining unit is configured to
      execute both the outside light detection mode and the inside detection mode either while the display unit is operated, or while the display unit is not operated.

6. The apparatus of claim 3, wherein the abnormality determining unit is configured to
   determine, immediately after the outside light detection mode, whether or not the luminance of the image is less than the third threshold and
   determine that the image acquiring unit is abnormal if the luminance of the image is less than the third threshold and then avoid the inside detection mode.

7. The apparatus of claim 2, further comprising a speed detection unit configured to detect a speed of the moving body,
   wherein the abnormality determining unit executes the outside light detection mode and the inside detection mode when the speed is a predetermined value or less.

8. The apparatus of claim 2, further comprising a display unit configured to display a given matter about the moving body,
   wherein the image acquiring unit is installed at or near the display unit, and
   the abnormality determining unit is configured to
      execute both the outside light detection mode and the inside detection mode either while the display unit is operated, or while the display unit is not operated.

9. The apparatus of claim 2, wherein the abnormality determining unit is configured to
   determine, immediately after the outside light detection mode, whether or not the luminance of the image is less than the third threshold and
   determine that the image acquiring unit is abnormal if the luminance of the image is less than the third threshold and then avoid the inside detection mode.

10. The apparatus of claim 1, wherein the lighting unit comprises, in the moving body, a first lighting unit configured to illuminate one side of the moving body in a vehicle widthwise direction and a second lighting unit configured to illuminate the other side of the moving body in the vehicle widthwise direction; and
    the abnormality determining unit is configured to
       execute a first inside detection mode in which the luminance acquiring unit acquires the luminance of the image while the first lighting unit receives an instruction to turn light on and the second lighting unit receives an instruction to turn light off and determine, based on a result of the first inside detection mode, a presence or absence of an abnormality in the first lighting unit, and
       execute a second inside detection mode in which the luminance acquiring unit acquires the luminance of the image while the first lighting unit receives an instruction to turn light off and the second lighting unit receives an instruction to turn light on and determine, based on a result of the second inside detection mode, a presence or absence of an abnormality in the second lighting unit.

11. The apparatus of claim 1, wherein the lighting unit comprises, in the moving body, a first lighting unit configured to illuminate one side of the moving body in a vehicle widthwise direction and a second lighting unit configured to illuminate the other side of the moving body in the vehicle widthwise direction; and the abnormality determining unit is configured to
execute an inside detection mode in which the luminance acquiring unit acquires the luminance of the image while the first lighting unit and the second lighting unit each receive an instruction to turn light on and determine a presence or absence of an abnormality in the first lighting unit on a basis of luminance in an area that is within the image obtained under the inside detection mode and is illuminated by the first lighting unit and determine a presence or absence of an abnormality in the second lighting unit on a basis of luminance in an area that is within the image obtained under the inside detection mode and is illuminated by the second lighting unit.

12. A method for determining an abnormality in internal devices including an image acquiring unit configured to acquire an image inside a moving body, a luminance acquiring unit configured to acquire luminance of the image, and a lighting unit configured to illuminate an occupant of the moving body, the method comprising an abnormality determining step of determining, based on the luminance of the image, a presence or absence of an abnormality in the image acquiring unit and/or the lighting unit, wherein the abnormality determining step determines that the internal devices are normal when the luminance of the image is equal to or greater than a first threshold while the lighting unit receives an instruction to turn light on;

the abnormality determining step determines that the lighting unit is abnormal when the luminance of the image is equal to or greater than a third threshold and less than a second threshold while the lighting unit receives an instruction to turn light on;

the abnormality determining step determines that at least the image acquiring unit is abnormal when the luminance of the image is less than the third threshold while the lighting unit receives an instruction to turn light on; and the second threshold is less than the first threshold and greater than the third threshold.

13. A non-transitory computer readable recording medium recording a program for executing, in a computer, the method of claim 12.

* * * * *